(12) United States Patent
Willinger

(10) Patent No.: US 6,516,747 B1
(45) Date of Patent: *Feb. 11, 2003

(54) NON SKID PET BOWL

(75) Inventor: Jonathan Willinger, Tenafly, NJ (US)

(73) Assignee: JW Pet Company, Inc., Hasbrook Heights, NJ (US)

( * ) Notice: Subject to any disclaimer, the term of this patent is extended or adjusted under 35 U.S.C. 154(b) by 9 days.

This patent is subject to a terminal disclaimer.

(21) Appl. No.: 09/709,219

(22) Filed: Nov. 8, 2000

(51) Int. Cl.[7] .......................... A01K 5/01; A47G 23/00; B65D 1/42
(52) U.S. Cl. .......................... 119/61; 220/574
(58) Field of Search .......................... 119/51.5, 61, 72; D30/129; 220/574, 574.3, 636, 626, 575, 635, 646

(56) References Cited

U.S. PATENT DOCUMENTS

| | | | | |
|---|---|---|---|---|
| 2,813,509 A | * | 11/1957 | Bruno | 119/51.01 |
| 3,722,476 A | * | 3/1973 | Van Ness et al. | 119/61 |
| 3,776,193 A | | 12/1973 | Post, Sr. | |
| 3,810,446 A | * | 5/1974 | Kightlinger et al. | 119/61 |
| 4,089,498 A | * | 5/1978 | Woodruff | 248/346.11 |
| 4,428,325 A | * | 1/1984 | Koch | 119/61 |
| 4,603,851 A | * | 8/1986 | Russell | 482/51 |
| 4,721,063 A | * | 1/1988 | Atchley | 119/52.1 |
| 4,886,016 A | | 12/1989 | Atchley | |
| 4,905,629 A | * | 3/1990 | Hand et al. | 119/61 |
| 4,981,108 A | * | 1/1991 | Faeroe | 119/61 |
| 4,986,433 A | * | 1/1991 | Davis | |
| 5,037,084 A | * | 8/1991 | Flor | 108/12 |
| 5,169,023 A | * | 12/1992 | Heiberg et al. | 220/254.7 |
| 5,392,948 A | * | 2/1995 | McEntee | 220/574 |
| 5,423,452 A | * | 6/1995 | Tardif | 220/574 |
| 5,546,894 A | | 8/1996 | St. Pierre | |
| 5,560,732 A | * | 10/1996 | Kulp et al. | 116/63 P |
| 5,564,363 A | | 10/1996 | Soffici | |
| 5,724,914 A | | 3/1998 | Nemeth | |
| 5,743,210 A | * | 4/1998 | Lampe | 119/51.5 |
| 5,813,638 A | * | 9/1998 | Morris | 220/574 |
| 5,857,427 A | * | 1/1999 | Kelley | 119/61 |
| 5,979,361 A | | 11/1999 | Willinger | |
| 6,119,628 A | * | 9/2000 | Lorenzana et al. | 119/77 |
| 6,152,319 A | * | 11/2000 | Kamachi et al. | 220/592.2 |
| 6,230,653 B1 | * | 5/2001 | Tobin | 119/72 |
| D446,362 S | * | 8/2001 | Choi et al. | D30/129 |
| 6,330,956 B1 | * | 12/2001 | Willinger | 220/574 |

* cited by examiner

Primary Examiner—Yvonne Abbott
(74) Attorney, Agent, or Firm—Katten Muchin Zavis Rosenman

(57) ABSTRACT

A pet bowl is provided with a non-skid material attached to an outer wall and having improved frictional and drag properties. The non-skid material is molded over a portion of the bottom of the bowl. The non-skid material has components that extend downwardly along the outer wall and outwardly from the outer wall to contact a ground surface, with a gap defined along a contact surface between the downwardly extending and outwardly extending components of the material. The outwardly extending component of the non-skid material is preferably longer than the downwardly extending component for increased drag capabilities and to further inhibit movement of said pet bowl along a ground surface.

28 Claims, 6 Drawing Sheets

NON SKID PET BOWL

FIELD OF THE INVENTION

The invention relates generally to a water or food bowl or dish for household pets and in particular to an improved non-skid pet food or water bowl including a non-skid material overmolded to a portion of the bottom of the bowl, said material further extending outwardly from an outer wall of said bowl.

BACKGROUND OF THE INVENTION

One type of bowl commonly utilized for household pets is a molded plastic bowl. The advantages of the molded plastic bowl are quite obvious: a plastic bowl is inexpensive to manufacture; it can be molded in a variety of colors; it can be easily cleaned; and it can be dropped or otherwise misused without significant damage to its structure. For these cited reasons, plastic bowls have been preferred by the typical pet owner over bowls manufactured of non-plastic materials.

While certainly preferred, plastic bowls do have some disadvantages as compared to bowls manufactured of other materials such as metallic bowls. A significant disadvantage and one that is a function of the plastic material is that plastic bowls are generally much lighter in weight than the metallic bowls. The drawback of a light bowl is that it can be easily displaced or moved by a pet while the pet attempts to eat or drink making it difficult if not impossible for the pet to successfully nourish itself. Moreover the light weight of a plastic bowl make it quite easy for a household pet to topple or turnover the bowl resulting in an unwanted mess or hazardous condition.

In order to address the insufficiency in the weight of plastic bowls, various means have been employed to manufacture a heavier and more substantial bowl. One method employed has been to mold a plastic bowl with thicker and denser plastic walls; the benefit, of course, being that the added plastic results in a heavier bowl making it less susceptible to being displaced or moved by a pet during use. Another method employed has been to mold a plastic bowl with an inner and outer wall so as to define a chamber between the walls. Within the chamber is provided some type of ballast material such as sand or cement making the bowl substantially heavier and thus difficult to displace during use. While these methods have been generally satisfactory, these bowls are generally more complicated to manufacture and/or may require more raw material and are consequently more costly to manufacture.

In lieu of weighting the bowls, some bowls have been fitted at their lower ends with a resilient non-skid plastic or rubber piece or strip which is put in place after molding is completed in a secondary operation or which is co-molded over said underside in the same manufacturing process as shown in U.S. Pat. No. 5,979,361. The resilient strip which is in contact with the ground prevents the bowl from being slid by providing a friction force between the strip and the contact surface (ground). Non-skid strips of this nature have been found to be satisfactory for purposes of increasing the frictional contact between the bowl and the ground. However, such strips are generally limited by the amount of material contacting the ground surface as well as the gripping properties of the non-skid material.

There is a need, therefore, for a pet bowl having improved non-skid properties that is not necessarily dependent on the extent of the non-skid material contacting the ground surface. Such need is met by the pet bowl of the present invention, which incorporates a non-skid material with improved frictional and drag properties.

OBJECTS OF THE INVENTION

It is an object of the present invention, therefore, to provide a non-skid pet bowl having improved frictional and drag properties.

It is a further object of the present invention to provide a non-skid pet bowl having a non-skid material overmolded to a bottom portion of the bowl.

It is a still further object of the present invention to provide a non-skid pet bowl having a non-skid material molded to the bottom of the bowl, a portion of which extends outwardly from an outer wall of said pet bowl.

It is a still further object of the present invention to provide a non-skid pet bowl having a non-skid material attached to an outer wall, said non-skid material having a first portion extending downwardly from said outer wall and a second portion extending outwardly from said outer wall.

It is a still further object of the present invention to provide a non-skid pet bowl having a non-skid material attached to an outer wall, said non-skid material having a first portion extending downwardly from said outer wall and a second portion extending outwardly from said outer wall and an air gap formed between said first and second portions.

It is a still further object of the present invention to provide a non-skid pet bowl having a non-skid material attached to an outer wall, said non-skid material having a first portion extending downwardly from said outer wall and a second portion extending outwardly from said outer wall, said second portion being longer than said first portion to create more drag and to inhibit movement of said pet bowl along a contact surface.

Still other objects and advantages of the invention will become clear upon review of the following detailed description in conjunction with the appended drawings.

SUMMARY OF THE INVENTION

A food or water bowl for household pets, which may not be easily displaced or moved by the normal activity of the pet, is provided with a non-skid material attached to an outer wall and having improved frictional and drag properties. A layer of non-skid is molded onto a bottom portion of the bowl and preferably extends both downwardly and outwardly from said outer wall to contact a ground surface. An air gap is defined along said contact surface between said downwardly extending and outwardly extending components of said non-skid material to increase the resistance to movement of said pet bowl along a ground surface. At least one outwardly extending component of the non-skid material is preferably longer than the downwardly extending component for increased drag capabilities and to further inhibit movement of said pet bowl along a ground surface.

DETAILED DESCRIPTION OF THE PREFERRED EMBODIMENTS

Figure 1:
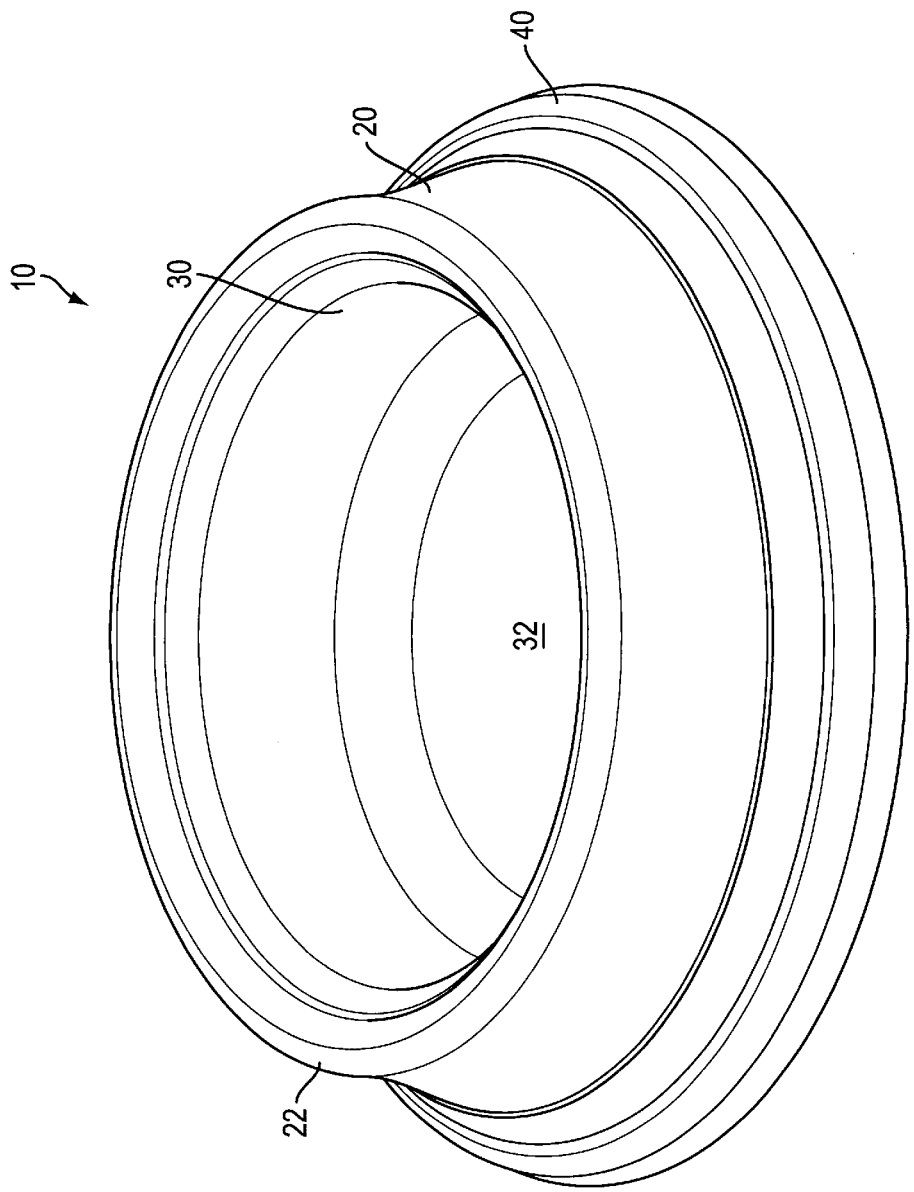
FIG. 1 is a perspective view of the non-skid pet bowl of the present invention.
Figure 2:
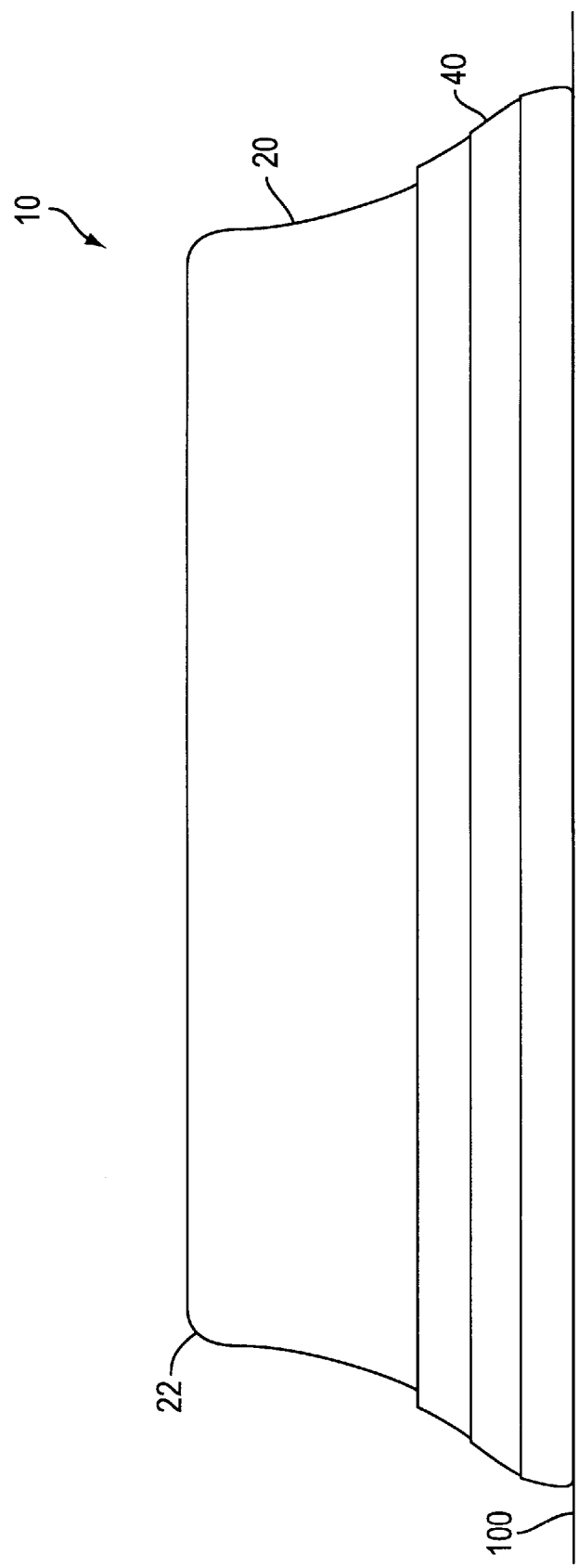
FIG. 2 is a side elevation view of the bowl of FIG. 1.

The following detailed description is of the best mode or modes of the invention presently contemplated. Such description is not intended to be understood in a limiting sense, but to be an example of the invention presented solely for illustration thereof, and by reference to which in connection with the following description and the accompanying drawings one skilled in the art may be advised of the advantages and construction of the invention. In the various views of the drawings, like reference characters designate like or similar parts.

FIGS. 1–6 illustrate the non-skid pet bowl 10 of the present invention resting on a contact surface (ground) 100, which bowl 10 includes an outer wall 20, an inner wall 30 and a non-skid material 40 attached to said outer wall 20. The outer wall 20 further comprises an upper end 22 and a lower end or rim 24, while the inner wall 30 further comprises a bottom wall 32 preferably extending substantially along a horizontal plane upon which is usually placed food, water or the like. The outer wall 20 and inner wall 30 are preferably integrally formed as a one-piece structure from a rigid plastic material such as Lexan, Acrylic, ABS or polypropylene.

The non-skid material 40 of the present invention is preferably adhered to the bowl 10 according to a two material injection molding process. One example of such a process utilizes a two material injection molding machine along with either a rotating platen or rotating mold. A rotating platen or rotating mold (not shown) utilized in conjunction with the two material machine is utilized to secure the non-skid material 40 to a portion of the bottom of the pet bowl 10. In particular, a relatively thin layer of a thermoplastic elastomer (TPE) would be over-molded onto the lower end 24 of the outer wall 20 of a pre-molded plastic bowl 10. In practice, the bowl is first molded out of a conventional plastic such as Lexan, Acrylic, ABS or more commonly polypropylene. Then, the non-skid material is then molded over the existing dog bowl. Employing this method, the resulting bond between the non-skid material and existing bowl is significantly stronger than can be obtained by manual fitting or by the use of adhesives.

Figure 3:
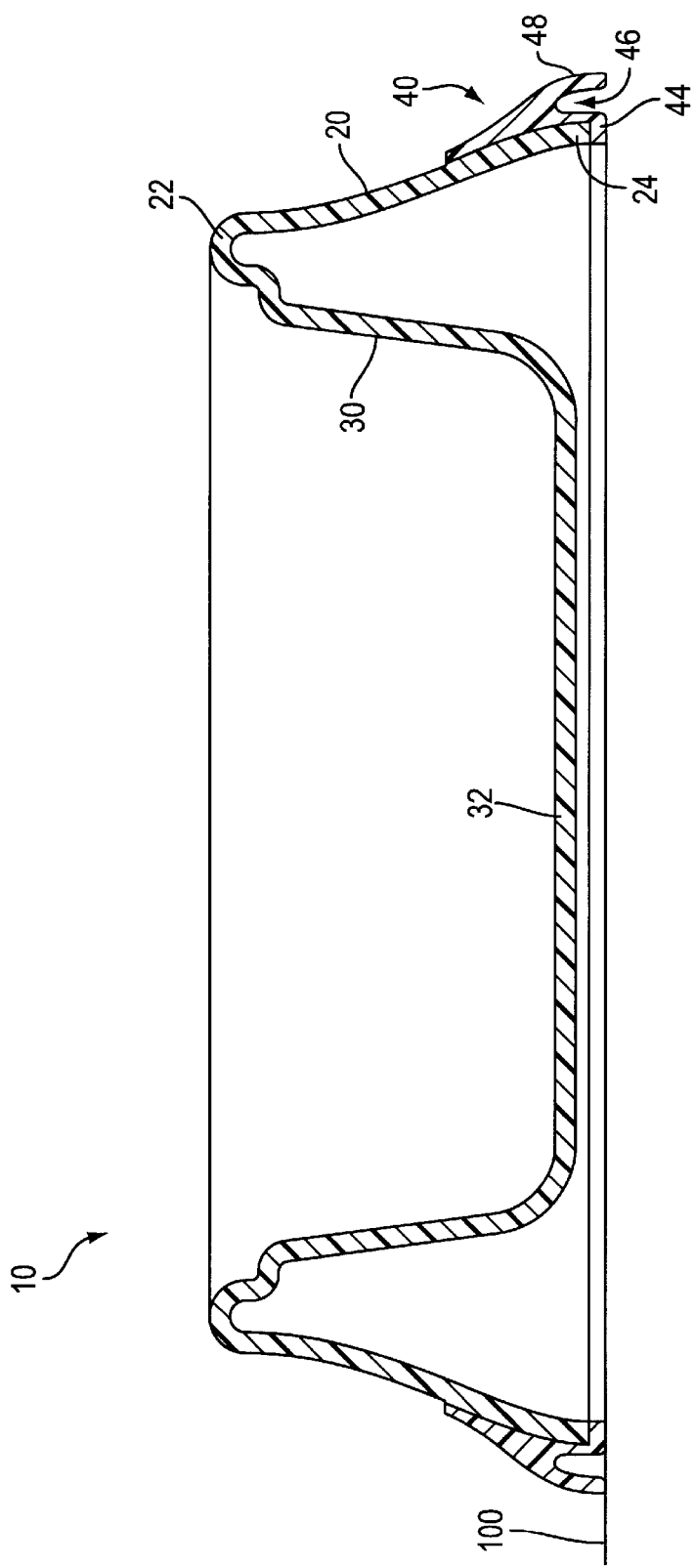
FIG. 3 is cross-sectional view of the bowl of FIG. 1 taken along a diameter of said bowl.
Figure 4:
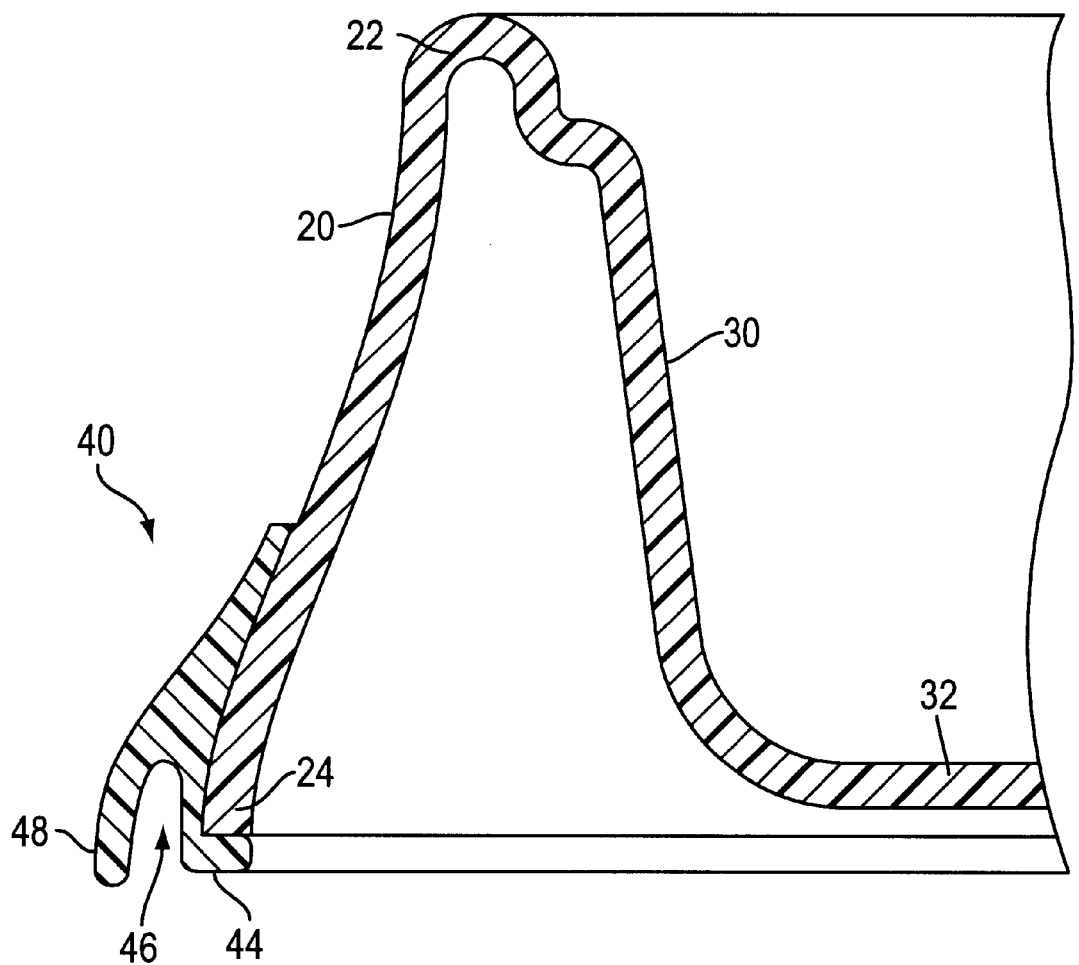
FIG. 4 is a close up view of an alternative embodiment of the non-skid material of the bowl of the present invention.
Figure 5:
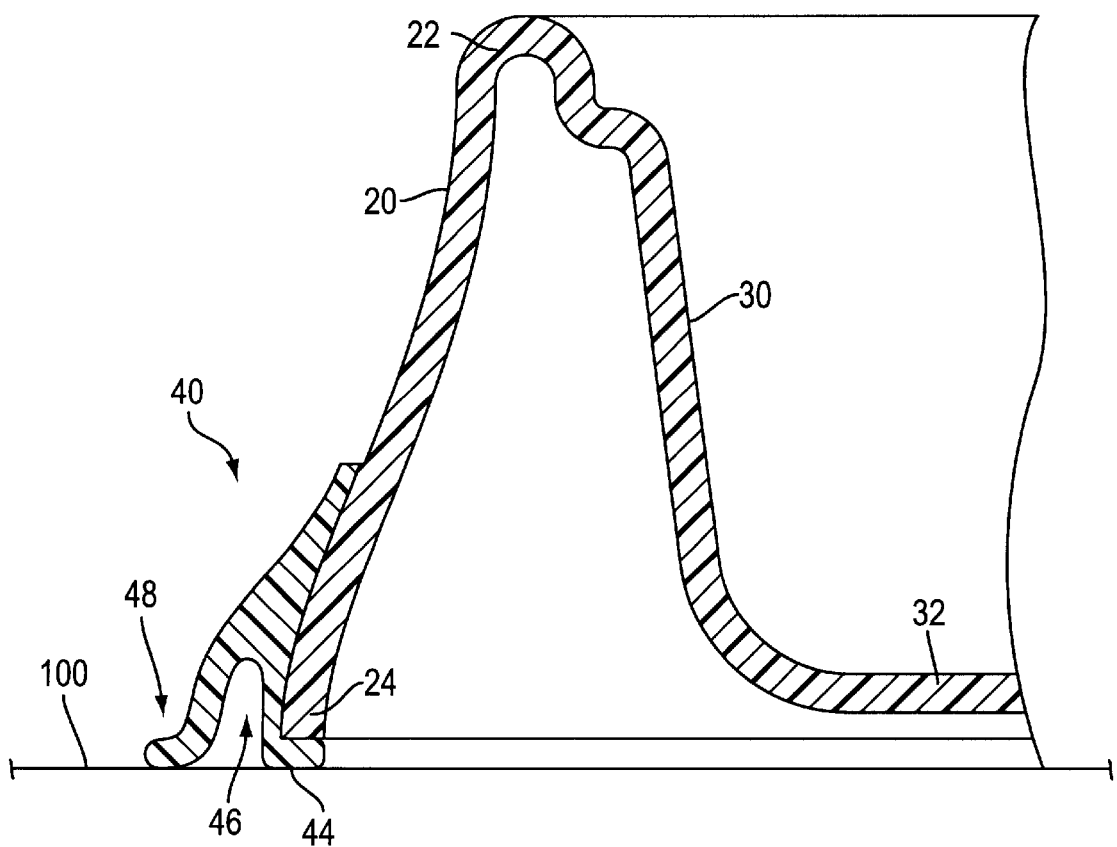
FIG. 5 is a close up view of the bowl of FIG. 4 resting on a contact surface.

The non-skid material 40 overmolded to the outer wall 20, as particularly shown in FIGS. 3–5, further comprises a downwardly extending component 44 and an outwardly extending component 48 with a gap 46 defined therebetween. The downwardly extending component 44 extends along the lower end 24 of the outer wall 20 and contacts the ground surface 100 instead of the lower end 24 of the outer wall 20. The outwardly extending component 48 preferably extends laterally and downwardly away from the outer wall 20 and laterally from the downwardly extending component 44 of the non-skid layer 40, and also contacts the ground surface 100 as shown. The non-skid material 40 also extends upward along the outer wall 20 from the lower end 24 of the outer wall 20 to above the plane defined by the bottom wall 32 of the inner wall 30 as defined above. Extending the non-skid material 40 to run up the outer wall 20 is desirable from a manufacturing viewpoint since it provides a greater surface area to attach or overmold the non-skid material 40 onto the bowl 10, thereby providing a greater connection between these two materials, which provides a more durable and longer lasting product.

An example of a suitable non-skid material 40 is a thermoplastic elastomer (TPE) material, which is preferably softer than the hard plastic material from which the inner and outer walls 20, 30 of the bowl 10 is formed. TPE material also tends to have enhancing gripping properties, which further inhibit movement of the bowl 10 along a ground surface due to normal animal contact and the like. From a manufacturing viewpoint, it is also preferable that the layer of non-skid material 40 is integrally formed or overmolded to the bowl 10 through a two material injection molding process, although such material 40 may also be affixed to the bowl 10 using adhesives or the like.

In addition to the frictional, gripping properties attributed to the type of material forming the non-skid layer 40, the geometry of the non-skid material 40 provides several advantages over a single layer of non-skid material as known in the art. For example, the gap 46 formed along the contact surface 100 between the downwardly extending component 44 and the outwardly extending component 48 of the non-skid material 40 provides a suction effect which will also prevent the bowl 10 from being skid or toppled over by a pet. Therefore, not only does the combination of the components 44, 48 contacting the ground surface 100 provide a non-skid effect, but it also provides a suction effect due to the lateral spacing between downward component 44 and the outward component 48.

Furthermore, because the non-skid material 40 tends to also be both bendable and resilient, the outwardly extending component 48 serves to stabilize the bowl 10 and accommodate irregular ground or contact surfaces 100. The enlarged footprint provided by the outwardly extending non-skid material 40 provides even further stabilizing support.

In an alternative embodiment illustrated in FIGS. 4 and 5, the outwardly extending component 48 of the non-skid material 40 is longer than downwardly extending component 44, which provides for additional drag in response to movement of the bowl 10 along a contact surface 100. In other words, when the bowl 10 is placed on a contact surface 100, the longer, outwardly extending component 48 tends to flex outwardly as shown in FIG. 5, which, in addition to the suction effect provided by the gap 46 as discussed above, further inhibits movement along a contact surface 100. The outwardly extending component 48 flexes outwardly in response to the weight of the bowl 10 and/or the contents provided therein, and movement imparted to said bowl 10 in hindered by the outward flex of said component 48. Lateral movement imparted to said bowl 10 by an animal or human is further hindered due to the dissimilarly sized contact areas arising between the downwardly extending component 44 and the outwardly extending component 48 of the non-skid material 40 and the contact surface 100 being contacted by said components.

Figure 6:
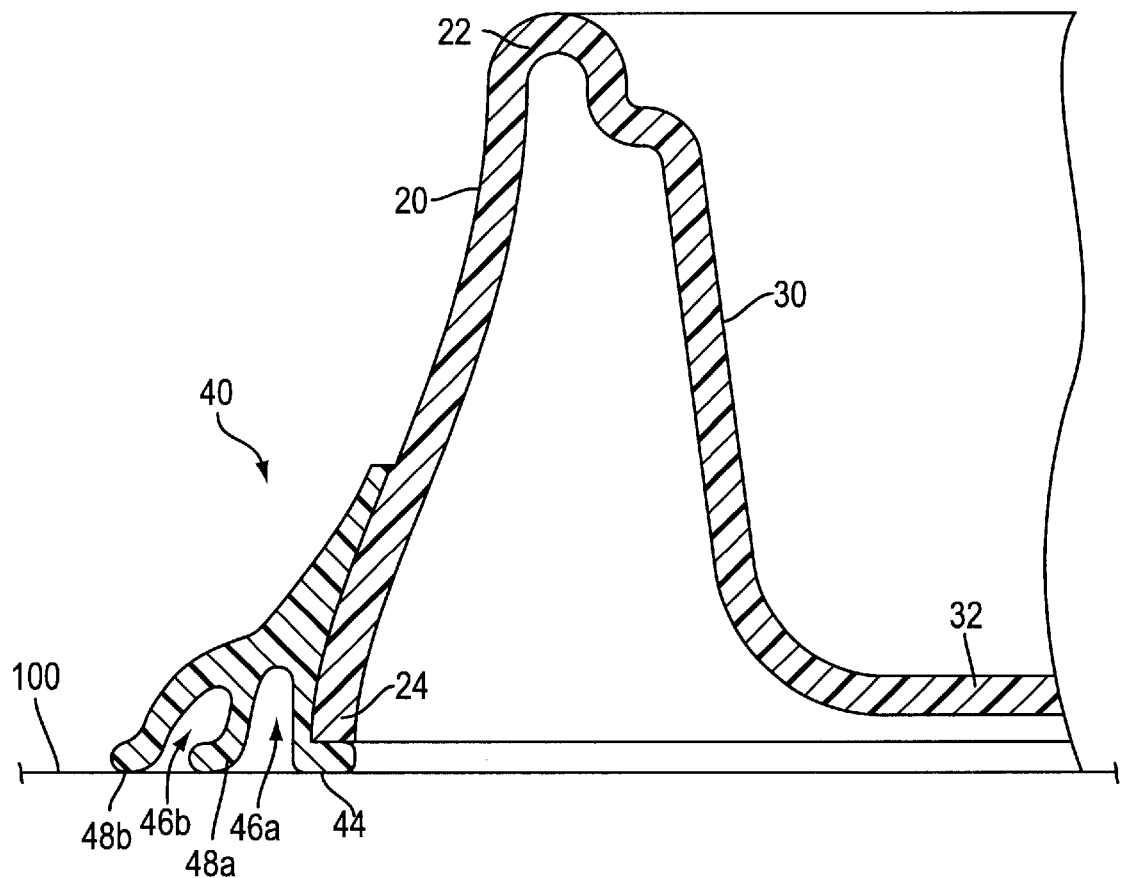
FIG. 6 is a close up view of an alternative embodiment of the non-skid material of the bowl of the present invention.

It should also be noted that although the non-skid material 40 has been shown as having only one component 48 extending outwardly from the outer wall 20 of the bowl 10, the present invention also contemplates a plurality of outwardly extending components 48a, 48b extending from the outer wall 20 as shown in FIG. 6 having a plurality of suction gaps 46a, 46b, which would contribute even greater suction and drag forces for inhibiting movement of the bowl 10 along a contact surface 100.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention.

I claim:

1. A non-skid pet bowl for placement on a surface, comprising:
   a) an injection molded bowl made from a first material having an outer wall, an inner wall and a bottom, and
   b) a non-skid material differing from said first material and integrally injection molded over a portion of said bottom of said injection molded bowl.

2. A non-skid pet bowl in accordance with claim 1, wherein said non-skid material extends up said outer wall.

3. A non-skid pet bowl in accordance with claim 1, wherein said non-skid material is a thermoplastic elastomer material.

4. A non-skid pet bowl in accordance with claim 3, wherein said first material is harder than said non-skid material.

5. A non-skid pet bowl in accordance with claim 4, wherein said first material is polypropylene.

6. A non-skid pet bowl in accordance with claim 1, wherein said portion of said bottom further comprises a rim portion.

7. A non-skid pet bowl for placement on a surface, comprising:
   a) an injection molded bowl having an outer wall, an inner wall and a bottom, and
   b) a non-skid material integrally injection molded over a portion of said bottom of said injection molded bowl,
   c) wherein a first component of said non-skid material extends outwardly from said outer wall so as to form a gap between said first component of said non-skid material and a surface contacting end of said outer wall.

8. A non-skid pet bowl in accordance with claim 7, wherein said non-skid material further comprises a second component disposed along said surface contacting end of said outer wall.

9. A non-skid pet bowl in accordance with claim 8, wherein said first component of said non-skid material is longer than said second component of said non-skid material.

10. A non-skid pet bowl in accordance with claim 7, wherein said first component of said non-skid material extends outwardly and downwardly away from said outer wall.

11. A non-skid pet bowl for placement on a surface, comprising:
    a) an injection molded bowl made from a first material having an inner wall and an outer wall terminating in a rim, and
    b) a non-skid material differing from said first material and injection molded over said rim of said bowl, thereby providing the bowl with an overmolded non-skid rim.

12. A non-skid pet bowl in accordance with claim 11, wherein said non-skid material further comprises a first component extending along said outer wall and a second component extending outwardly from said outer wall and laterally spaced from said first component.

13. A non-skid pet bowl in accordance with claim 12, wherein said first and second components of said non-skid material are integrally connected.

14. A non-skid pet bowl in accordance with claim 12, wherein said first component of said non-skid material is shorter than said second component.

15. A non-skid pet bowl in accordance with claim 12, further comprising at least one additional component extending outwardly from said outer wall and laterally spaced from said first component.

16. A non-skid pet bowl in accordance with claim 12, wherein said second component of said non-skid material extends outwardly and downwardly from said outer wall.

17. A non-skid pet bowl in accordance with claim 11, wherein said non-skid material is a thermoplastic elastomer material.

18. A non-skid pet bowl in accordance with claim 17, wherein said first material is polypropylene.

19. A non-skid pet bowl in accordance with claim 11, wherein said non-skid material is integrally injection molded only over said rim.

20. A non-skid pet bowl for placement on a surface, comprising:
    a) an injection molded bowl having an inner wall and an outer wall terminating in a rim, and
    b) a non-skid material injection molded over said rim of said bowl, thereby providing the bowl with an overmolded non-skid rim,
    c) wherein said inner wall further comprises a bottom wall extending along a first plane, and said non-skid material extends along said outer wall above said first plane.

21. A non-skid pet bowl for placement on a surface, comprising:
    a) an injection molded bowl having an inner wall and an outer wall terminating in a rim, and
    b) a non-skid material injection molded over said rim of said bowl, thereby providing the bowl with an overmolded non-skid rim,
    c) wherein said non-skid material further comprises a first component extending along said outer wall and a second component extending outwardly from said outer wall and laterally spaced from said first component, and
    d) wherein said second component of said non-skid material is movable with respect to said first component.

22. A non-skid pet bowl for placement on a surface, comprising:
    a) an injection molded bowl having an inner wall and an outer wall terminating in a rim, and
    b) a non-skid material injection molded over said rim of said bowl, thereby providing the bowl with an overmolded non-skid rim,
    c) wherein said non-skid material further comprises a first component extending along said outer wall and a second component extending outwardly from said outer wall and laterally spaced from said first component, and
    d) further comprising an air gap formed between said first and second components of said non-skid material.

23. A method of fabricating a non-skid pet bowl, comprising the steps of:
    a) injection molding a bowl having a bottom formed of a first material, and
    b) injection molding a layer of non-skid material differing from said first material over a portion of said bottom of said bowl.

24. A method in accordance with claim 23, wherein said non-skid material is a thermoplastic elastomer material.

25. A method in accordance with claim 23, wherein said non-skid material further comprises a first component extending along said outer wall and a second component extending outwardly from said outer wall and laterally spaced from said first component.

26. A method in accordance with claim 23, wherein said portion of said bottom further comprises a rim portion.

27. A non-skid pet bowl for placement on a surface, comprising:
- a) an injection molded bowl having an outer wall, an inner wall and a bottom, and
- b) a non-skid material integrally injection molded over a portion of said bottom of said injection molded bowl,
- c) wherein said portion of said bottom further comprises a rim portion, and
- d) wherein said non-skid material is integrally injection molded over said rim portion only.

28. A method of fabricating a non-skid pet bowl, comprising the steps of:
- a) injection molding a bowl having a bottom formed of a first material, and
- b) injection molding a layer of non-skid material over a portion of said bottom of said bowl,
- c) wherein said portion of said bottom further comprises a rim portion, and
- d) further comprising the step of injection molding a layer of non-skid material over only said rim portion.

* * * * *